United States Patent Office 3,296,675
Patented Jan. 10, 1967

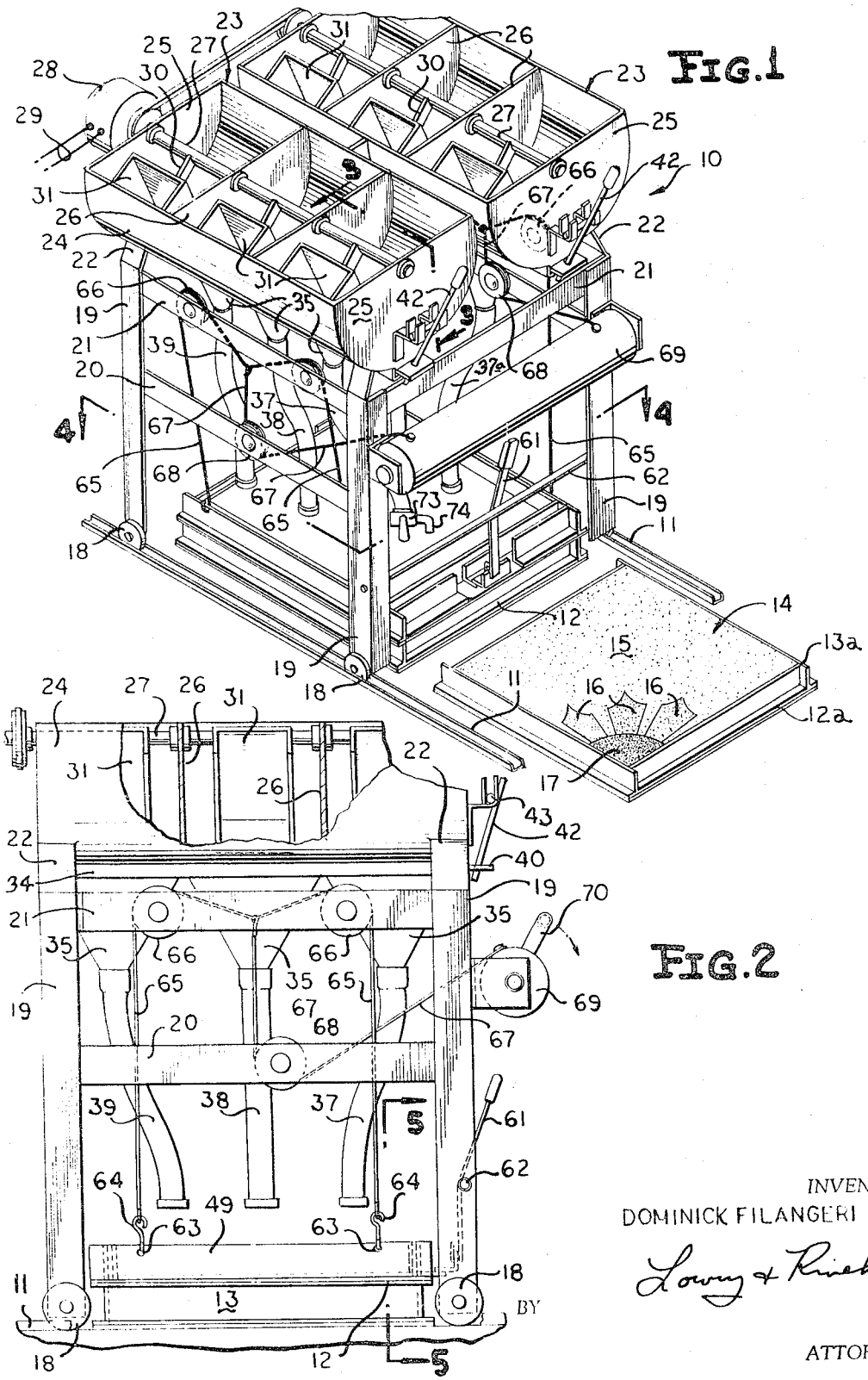

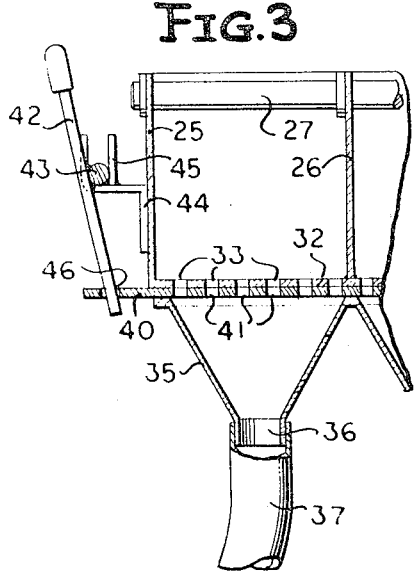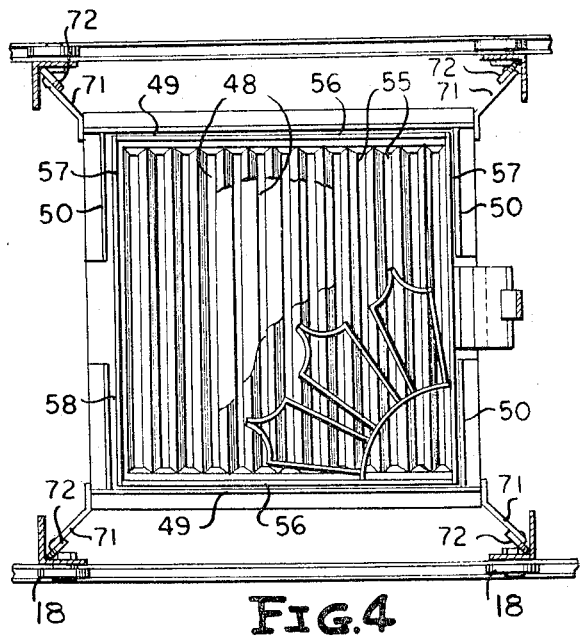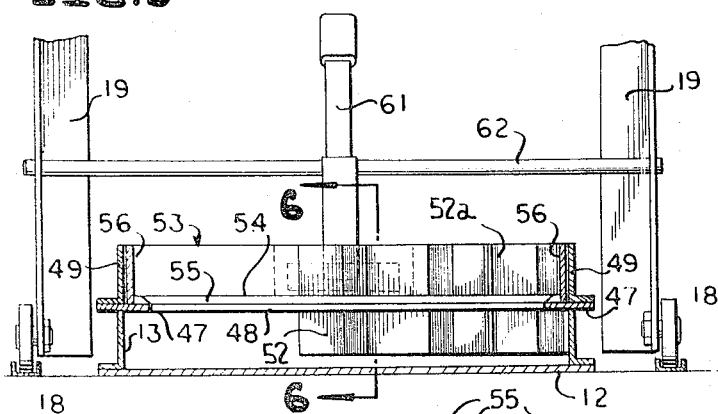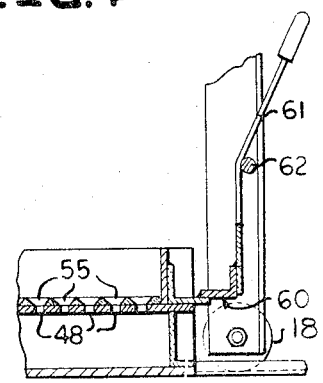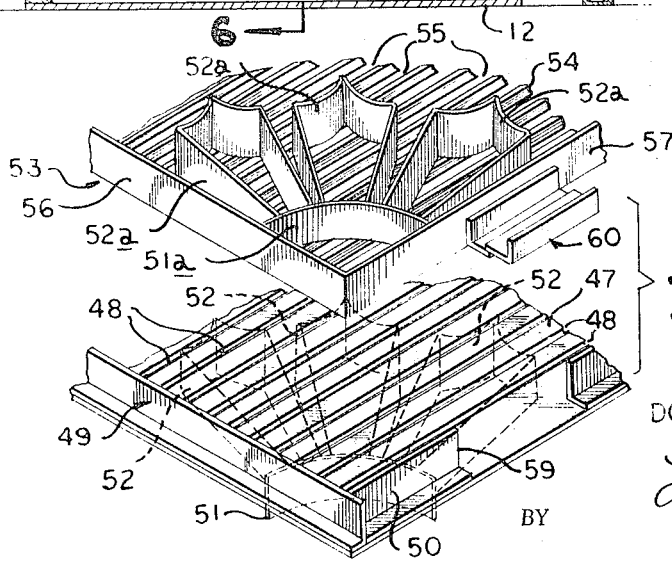

3,296,675
APPARATUS FOR MOLDING ORNAMENTAL
BUILDING BLOCKS
Dominick Filangeri, 70 Ave. V, Brooklyn, N.Y. 11209
Filed Jan. 27, 1965, Ser. No. 428,336
12 Claims. (Cl. 25—41)

This invention relates to ornamental building block molding apparatus and more particularly to apparatus for molding ornamental building blocks having multi-color designs integrally cast therein.

There is presently a very heavy demand for ornamental paving blocks such as are used on patios and outdoor terraces. One of the most commonly used materials for this purpose has been flagstone, but this material is quite expensive, particularly where high quality stone has been carefully quarried and squared into regular blocks readily and evenly laid. Further, this stone does not occur in all areas, and in those areas in which it does not naturally occur it must be shipped in, the freight for this very heavy material further adding to the cost. The result is that the suppliers have turned to a precast cement block which may be made locally and sold for a substantially lower price than natural stone.

One of the problems with the precast cement blocks has been that the natural cement lacks architectural color and texture, and an effort has been made to make these blocks more ornamental and more attractive in appearance. A very attractive block may be made by using pigment fillers to color the cement, with designs of varied colors being cast integrally in the block. Artificial surface coloring is not satisfactory in blocks of this type, since they are subject to weather, water and heavy wear. The design, therefore, must be an integral part of the block, must be sharp, clear and non-fading, and must be deep enough to allow for wear without the design being quickly destroyed.

All prior methods of making such a block have been hand methods, precluding any production in quantity and making the cost so high as to defeat the desired economy in using a precast cement block.

It is an object of the present invention, therefore, to provide an apparatus for molding ornamental building blocks, having multicolor designs integrally cast therein, on an economical production basis.

Still another object of the invention is to provide an apparatus which may be moved readily from mold box a mold box without disturbing or moving a mold box just cast, and which may be used, if desired, on a series of mold boxes joined end to end.

Another object of the invention is to provide apparatus which is highly flexible and may readily be changed from one design to another without major rebuilding or disassembly of the machine.

Still another object of the invention is to provide apparatus which may be easily taken apart for cleaning at the end of a work cycle, or if a shift is being made to different colors of cement.

Another object of the present invention is to provide apparatus wherein the supply of varied color cements may be easily controlled, without smearing of the various colors over the apparatus, and insuring sharp, clear definition at the point where the wet, vari-colored plastic masses meet.

With the above and other objects in view, as will be presently apparent, the invention consists in general of certain novel details of construction and combinations of parts hereinafter fully described, illustrated in the accompanying drawings, and particularly claimed.

In the drawings, like characters of reference indicate like parts in the several views, and FIGURE 1 is an isometric view of a preferred embodiment of the apparatus, with a fragmentary portion of the track system used to guide the apparatus along a row of platens and mold frames;

FIGURE 2 is a side elevational view of the apparatus of FIGURE 1;

FIGURE 3 is a fragmentary cross-sectional view taken on the line 3—3 of FIGURE 1;

FIGURE 4 is a horizontal sectional view taken on the line 4—4 of FIGURE 1, a portion of the valve tray being broken away to show the registering valving apertures;

FIGURE 5 is a fragmentary, vertical sectional view taken on the line 5—5 of FIGURE 2;

FIGURE 6 is a vertical sectional view taken on the line 6—6 of FIGURE 5; and

FIGURE 7 is a fragmentary, exploded view of the depositing tray and the valve tray, particularly showing the details and relationship of the separator plates which form the integral design in the ornamental block.

With specific reference to the drawings, the reference numeral 10 generally designates the molding apparatus which travels as a unit along the tracks 11. These tracks may be placed on the floor, but preferably would be placed on an elongated raised platform which would be at working height for handling the platens 12. On each platen would be placed a mold frame 13. The platen and frame form a unit for receiving and holding a cast building block 14 until the plastic mix is set. The block 14 comprises a main mass 15, decorative inserts 16, and a further decorative insert 17. The design shown is, of course, illustrative only, and any desired design may be used. The important point is that the mass 15 and the inserts 17 and 16 be formed of different pigmented cements, so that there will be a clear visual contrast to form the design. Any combination of colors may be used and any number of colors may be used, as long as there are sufficient supply compartments for each color and a sufficient number of supply tubes to carry the separate colors to each compartment.

The tracks 11 in the drawing are shown fragmentarily, but they would in an actual installation be relatively long, so that the machine could pass along a whole series of platens and mold frames, making it possible to leave the deposited masses undisturbed until a sufficient set of the cement has been achieved that movement of the platens would not disturb or disintegrate the design.

While FIGURE 1 shows a series of separate platens and mold frames, it would be possible to make a series of connected frames on a single elongated platen. Further, it would be possible to have a series of integrally connected units of the molding apparatus travelling side by side over multiple rows of platens, and it will be understood that the single unit apparatus has been disclosed for illustrative purposes only.

The molding apparatus 10 moves along the tracks 11 on the wheels 18 shown spaced on each corner of the frame, and the apparatus is easily moved but accurately guided along a row of mold frames.

The main frame of the apparatus is preferably formed of welded structural steel. There are in the embodiment shown four vertical corner posts 19 preferably formed of angle iron. These are connected by lower horizontal struts 20 and upper horizontal struts 21, which form a rigid frame. Angle struts 22 are welded to the top ends of the vertical corner posts, and these struts are secured to and support the cement mixing troughs 23. These troughs are shown as welded to the angle struts but could easily be removably secured for cleaning purposes or for an exchange to troughs having additional compartments. The troughs are exact duplicates of each other.

Each trough is formed of a semi-cylindrical half-shell 24 having end walls 25 and partitions 26. In the embodiment shown, this forms three separate compartments holding three different colors of cement, but as many compartments could be formed as needed. Journaled for rotation in the end walls and partitions is a shaft 27 driven by a motor unit 28 powered from the power leads 29. The second shaft is driven by a belt as shown. This motor unit may be a direct drive structure with self-contained reduction gears so that the shafts 27 will be driven at a very slow speed, with maximum power. The shaft 27 in each compartment is provided with an arm 30, which in turn supports a mixing blade 31. These blades preferably move very close to the half-shell of the trough to insure thorough mixing of the pigmented cement in each compartment, and as an aid in preventing clogging of the valving structure now to be described in detail.

In the bottom of each compartment is provided a fixed valve plate 32, this plate being provided with a plurality of apertures 33, which plurality preferably extends the width of the compartment, as shown in FIGURE 3.

Below the valve plates is an elongated slide housing 34 which extends the length of the trough 23. The bottom wall of this housing opens into a series of tapered discharge nozzles 35 which terminate in nipples 36. In the embodiment shown, these nipples are connected to discharge hoses 37, 38 and 39, respectively. In the slide housing 34 is mounted a sliding valve plate 40 which also extends the length of the trough. This sliding valve plate is provided with apertures 41, which when the sliding plate is in one position coincide exactly with the apertures 33 in the fixed valve plates, as shown in FIGURE 3. The solid portions between the apertures, however, have a dimension greater than the diameter of the apertures, and when the sliding valve plate is moved horizontally, the apertures are out of registry, and the solid portions of the sliding valve plate 40 block the apertures 33. The sliding valve plate is in tight operative relationship to the fixed valve plates 33, and when the apertures 33 are blocked the cement is prevented from leaving the mixing trough.

For operating the sliding valve plate 40, there is provided a lever arm 42. The lever arm 42 has welded thereto a transverse pivot pin 43. A pair of brackets 44 are welded to the end wall 25, and these brackets have U-shaped heads 45 which are open at the top and loosely receive the ends of the pivot pin 43. The lower end of the lever arm extends through an aperture 46 in the end of the sliding valve plate 40. It will be seen that by pressure on the knob end of the lever arm 42, the lever arm may be made to pivot about its pivot pin 43 causing the plate to slide to aperture-open or aperture-closed position, as desired. However, the valving means may be easily disassembled for cleaning by lifting the lever arm 42 out of the heads 45 and out of the aperture 46. The valve plate 40 may then be slid completely out of the slide housing 34.

The molding head which receives the pigmented cement from the hoses 37, 38 and 39 will now be described in detail.

This molding head comprises a base plate 47 which is provided with a plurality of regularly spaced, elongated, slotted apertures 48, and these apertures preferably extend substantially the width of the base plate. The base plate has attached thereto the side walls 49 and end walls 50. Extending downwardly perpendicularly from the bottom wall of the base plate are the thin metal blades 51 and 52 which are curved and shaped to the exact configuration of the design which is to be formed in the main mass of the block. These thin, blade-like plates are securely fastened at all points to the lower wall of the base plate so that they will project rigidly into the space defined by the platen 12 and the mold frame 13. See FIGURE 5, wherein the mold head is shown in casting position resting on the upper edge of the mold frame 13. The blades 51 and 52 extend almost to the bottom of the mold cavity in the view shown, but could extend to the bottom if desired. The critical requirement is that they extend a substantial distance into the mold cavity and that the base plate 47 rest tightly on the upper edge of the mold frame 13.

Resting directly on the base plate 47 is a valve box 53 which receives the deposit of cement from the discharge hoses 37, 38 and 39. The valve box 53 has a bottom plate 54, and this plate is provided with regularly spaced, elongated, slotted apertures 55, which, when the valve box 53 is in one overlying position relative to the base plate 47, are in exact correlated overlying alignment with the apertures 48 in the base plate. In this case the solid portions between the apertures have a width dimension greater than the width of the apertures so that when the valve box is moved out of registry with the base plate 47, the solid portions of the base plate will block the apertures 55 in the valve box 53. The edges of the apertures 55 are beveled for better mix discharge.

It will be noted, with specific reference to FIGURE 4, that the dimension between the side walls 49 of the base plate is only very slightly greater than the exterior dimension of the valve box across the side walls 56, so that the valve box may slide only in an endwise direction. However, the interior dimension between the end walls 50 of the base plate is great enough relative to the exterior dimension of the valve box from end wall 57 to end wall 57 that there is defined a slide clearance space 58. This clearance space has a width at least slightly greater than the width of the apertures 48 and 55, so that the valve box may be moved from the position shown in FIGURE 4 and FIGURE 6, wherein the apertures are in overlying alignment, to a position to the left of that shown, wherein the apertures 55 in the valve box are blocked by the solid portions between the apertures of the base plate.

To effect the sliding movement of the valve box between aperture-open and aperture-closed positions, the end wall 50 of the base plate is cut away to form the opening 59. A generally U-shaped bracket 60 is attached to the end wall 57 of the valve box 53, which projects through the opening 59. Secured to the outer leg of the U-shaped bracket is a lever arm 61 which preferably has its upper end angled outwardly of the frame of the apparatus. A fulcrum rod 62 extends between the vertical corner posts 19 and provides a fulcrum means for the lever arm 61 when the valve box is moved from open to closed position. The lever arm is not attached to the fulcrum rod, since this lever arm must move vertically with the mold head in a manner which will now be described in greater detail.

Each of the side walls of the base plat are provided with spaced apertures 63 which receive the ends of hooks 64. These hooks are attached to lift cables 65, each of which extend over a pulley 66 on the horizontal struts 21. At a midpoint between the pulleys 66 the lift cables are attached to the ends of draw cables 67. These draw cables 67 extend around pulleys 68 on the horizontal struts 20, and the outer ends are attached to the periphery of a winch drum 69. A handle 70 on the winch drum provides for manual rotation of the drum.

While one specific structure for raising and lowering the mold head has been described in detail, it will be understood that various lift mechanisms, either manual or power, could be used, the critical requirement being that the mold head be easily raised and lowered, while retaining the head in a level position at all times. The head need only be raised a sufficient distance to permit the lower edges of the thin metal design blades 51 and 52 to clear the top edge of the mold frame 13, so that the mold head may be moved away from the mold frame.

With further reference to the valve box 53, it will be noted that the upper face of the bottom plate 54 of the valve box is provided with upwardly directed thin metal mold blades 51a and 52a. These blades are exact duplicates of the blades 51 and 52 which extend downwardly from the base plate, and when the valve box is in the position shown in FIGURES 4 and 6, wherein the apertures 55 and 48 are in dispensing registry, the blades 51 and 51a and 52 and 52a will be in exact vertical alignment or registry. Thus, when the valve box is in open position, the material in the spaces defined by the blades 52a and 51a will flow only into the corresponding spaces defined by the blades 52 and 51 within the mold frame.

In order to guide the mold head as it is raised and lowered within the main frame, each corner of the base plate 47 has welded thereto an angle bracket 71 which carries a guide wheel 72. These guide wheels 72 will maintain the mold head centered within the frame and permit accurate positioning relative to a mold box.

In the embodiment shown in this application, the hose 37 will be positioned to deliver pigmented cement to the space defined by the blade 51a in the valve box. The hose 39 will deliver cement to the main space in the mold box outside of the space defined by the mold blades. The hose 38 will then be fitted with an adapter head 73 having nozzles 74 depositing in each of the blades 52a respectively. Thus, for example, white cement might be delivered by the hose 39, and the hoses 37a, 38a, 39a on the opposite side, deposit in the mold box outside of the design blades. Blue cement might be delivered through the hose 38 to the space between the blade 51a and the side walls 56 and 57, and yellow cement might be delivered through the hose 37 and adapter 73 to each of the spaces defined by the blades 52a.

It will be understood that the one embodiment shown is illustrative only and great flexibility may be used in designing the hose system for varied designs. Several hoses may go from one nozzle 35 to various parts of a given space for quicker and more even distribution. The hoses, for example, are preferably of a well known metal reinforced rubber or flexible metal, so that they may be quickly adjusted but will remain in adjusted position above a given space in the valve box.

Operation

In using the apparatus, a different colored pigmented cement is placed in each compartment of the mixing trough 23, with the sliding valve plate 40 moved to closed position, blocking the apertures 33 in the fixed valve plates 32. The motor 28 is then started and the shafts 27 rotate slowly, the mixing blades 31 keeping the mix from taking a set for a reasonable length of time.

The handle 70 is then turned to rotate the winch drum 69, and the draw cables 67 are wound simultaneously around the drum. This moves the cables 67 along their pulleys 68, and the ends attached to the lift cables 65 simultaneously and evenly draw the lift cables along their pulleys 66 to lift the base plate 47 and the valve box 53 which is supported thereon. This lifting of the mold head continues until the lower edges of the blades 51 and 52 clear the upper edge of a mold frame.

The molding apparatus is then moved along its tracks 11 until the mold head is in alignment with a mold frame. The handle 70 is then reversed or released, allowing the base plate 47 to move into tight engagement with the upper edge of the mold frame 13. As above noted, the design blades 51 and 52 will project well down into the mold frame 13.

The lever 61 is operated to move the valve box 53 in a direction (leftwardly in FIGURES 4 and 6) to close the apertures 55 in the valve box. The levers 42 are then operated to shift the sliding valve plates 40 to a position wherein the apertures 33 and 41 are in dispensing registry, the hoses having been carefully positioned over selcted compartments in the valve box. Cement will then move out of the separate compartments of the mixing trough, through the hoses 37, 38 and 39, 37a, 38a and 39a, to the various compartments in the valve box as defined by the side and end walls and the blades 51a and 52a. The pigmented cement will collect in these compartments until a sufficient amount is deemed by the operator to be present, whereupon the levers 42 will be moved to shift the sliding valve plate 40 to a closed position. The cement flow to the valve box is thereby stopped.

At this point, the lever 61 is shifted to move the valve box (rightwardly as in FIGURES 4 and 6) so that the apertures 55 and 48 are in dispensing registry. The pigmented cement in each compartment of the valve box will then pass through the apertures 55 and 48 into the corresponding compartmented space within the mold frame 13 as defined by the walls of the mold frame and the blades 51 and 52. Thus, the pigmented cements will be simultaneously deposited in the mold frame, the colors, however, remaining separate, this separation being accomplished by the blades 51 and 52 and their overlying, identical blades 51a and 52a.

After the mix has been thoroughly shaken and settled, being vibrated as necessary by any well known mold vibrating means, the valve box is shifted to closed position by the lever 61. The handle 70 is then turned, as before, to lift the mold head slowly, and as the base plate 47 is lifted, the blades 51 and 52 are slowly withdrawn from the mix deposited in the mold frame 13. The pigmented cements will then join to form an integral but sharply separate design. The molding apparatus 10 is again moved along its tracks until it is over another mold frame 13 and the cycle described above is repeated.

While the valve box is shown as fairly shallow, it will be understood that it could be made considerably deeper than the mold frames and several fillings be made from one deposit in the said valve box. It will be observed that the construction of the mold head permits the base plate 47 to be unhooked from the cables 65, the valve box and base plate being then removed, separated and thoroughly cleaned and scrubbed to remove incrusted cement.

The embodiment of the apparatus as disclosed is shown largely for manual operation, but it will be understood that the various operations could be motorized and power operated with suitable controls, without departing from the various broad relationships disclosed.

What is claimed is:

1. In a molding apparatus for ornamental building blocks;

a mold head, said mold head being adapted to be positioned over a mold frame;

said mold head including a first blade means projecting from the lower face thereof downwardly into said mold frame and defining design compartments within said mold frame, an upper compartmented box for receiving and holding a hardenable plastic mix in separated colors, said compartments being defined by a second blade means projecting upwardly from the bottom of said box, said second blade means having the same configuration as said first blade means and being in superposed alignment therewith, and passageway means connecting each of the compartments of said box with its corresponding compartment in said mold frame as defined by said first blade means.

2. In a molding apparatus for ornamental building blocks;

a mold head, said mold head being adapted to be positioned over a mold frame;

said mold head including a first blade means projecting from the lower face thereof downwardly into said mold frame and defining design compartments within said mold frame, an upper compartmented box for receiving and holding a hardenable plastic mix in separated colors, said compartments being defined by a second blade means projecting upwardly from the bottom of said box, said second blade means having the same configuration as said first blade means and being in superposed alignment therewith, a passageway means connecting each of the compartments of said box with its corresponding compartment in said mold frame as defined by said first blade means, and valve means for selectively opening and closing the connecting passageways.

3. A structure as set forth in claim 2, wherein said valve means comprises a pair of sliding plates having apertures moving into and out of registry to selectively open and close said passageways.

4. In a molding apparatus for ornamental building blocks;
   a mold head, said mold head being adapted to be positioned over a mold frame;
   said mold head including a plate and a first blade means projecting from the lower face thereof downwardly into said mold frame and defining design compartments within said mold frame, an upper compartmented box slidably mounted on said plate for receiving and holding a hardenable plastic mix in separated colors, said compartments being defined by a second blade means projecting upwardly from the bottom of said box, said second blade means having the same configuration as said first blade means and being in superposed alignment therewith, and aperture means in said plate and the lower wall of said box, said aperture means being in connecting alignment in a first position of said box on said plate and out of alignment in a second position of said box on said plate, whereby said aperture means will be selectively opened or closed by the movement of said box between said first and second positions.

5. In a molding apparatus for ornamental building blocks;
   a supporting frame;
   a mold head supported by said frame, said mold head being adapted to be positioned over a mold frame;
   said mold head including a first blade means projecting from the lower face thereof downwardly into said mold frame and defining design compartments within said mold frame, an upper compartmented box for receiving and holding a hardenable plastic mix in separated colors, said compartments being defined by a second blade means projecting upwardly from the bottom of said box, said second blade means having the same configuration as said first blade means and being in superposed alignment therewith, and passageway means connecting each of the compartments of said box with its corresponding compartment in said mold frame as defined by said first blade means; and
   means on said frame for raising and lowering said mold head relative to said mold frame.

6. A structure as set forth in claim 5, wherein said supporting frame is provided with wheel means to permit movement of said apparatus from one mold frame to another.

7. In a molding apparatus for ornamental building blocks;
   a supporting frame;
   a mold head supported by said frame, said mold head being adapted to be positioned over a mold frame;
   said mold head including a first blade means projecting from the lower face thereof downwardly into said mold frame and defining design compartments within said mold frame, an upper compartmented box for receiving and holding a hardenable plastic mix in separated colors, said compartments being defined by a second blade means projecting upwardly from the bottom of said box, said second blade means having the same configuration as said first blade means and being in superposed alignment therewith, and passageway means connecting each of the compartments of said box with its corresponding compartment in said mold frame as defined by said first blade means;
   means on said frame for raising and lowering said mold head relative to said mold frame;
   compartmented storage means mounted on said frame for separately storing and mixing quantities of various colors of said hardenable plastic mix;
   tube means leading from each storage and mixing compartment to a compartment in said compartmented box; and
   valve means for controlling the flow of mix from said storage and mixing means to the compartments in said box.

8. A molding apparatus as set forth in claim 7, said valve means including a valve for each compartment and a single operator for all of said valves, wherein said valves may be simultaneously opened and closed.

9. A molding apparatus as set forth in claim 7, said valve means including first aperture means at the bottom of each compartment, a single elongated valve plate slidably mounted in a guideway adjacent said apertures and having spaced aperture means movable into and out of alignment with said first aperture means, said valve plate being completely removable from the end of said guideway for cleaning purposes.

10. A molding apparatus as set forth in claim 7, said valve means including first aperture means at the bottom of each compartment; a single elongated valve plate slidably mounted in a guideway adjacent said apertures and having spaced aperture means movable into and out of alignment with said first aperture means, said valve plate further having an aperture adjacent its free end; a lever arm having one end removably extending through said end aperture; and fulcrum means on said frame releasably holding an intermediate portion of said lever arm.

11. In a molding apparatus for ornamental building blocks;
   a supporting frame;
   a mold head supported by said frame, said mold head being adapted to be positioned over a mold frame;
   said mold head including a first blade means projecting from the lower face thereof downwardly into said mold frame and defining design compartments within said mold frame, an upper compartmented box for receiving and holding a hardenable plastic mix in separated colors, said compartments being defined by a second blade means projecting upwardly from the bottom of said box, said second blade means having the same configuration as said first blade means and being in superposed alignment therewith, passageway means connecting each of the compartments of said box with its corresponding compartment in said mold frame as defined by said first blade means, and valve means for controlling the flow of mix through said passageway means;
   means on said frame for raising and lowering said mold head relative to said mold frame;
   compartmented storage means mounted on said frame for storing and mixing separately colored quantities of said hardenable plastic mix;
   tube means leading from each compartment to a compartment in said compartmented box; and
   valve means for controlling the flow of mix from said storage and mixing means to the compartments in said box.

12. In a molding apparatus for ornamental building blocks;
   a supporting frame;
   a mold head supported by said frame, said mold head being adapted to be positioned over a mold frame;
   said mold head including a first blade means projecting from the lower face thereof downwardly into said mold frame and defining design compartments within said mold frame, an upper compartmented box for receiving and holding a hardenable plastic mix in separated colors, said compartments being defined by a second blade means projecting upwardly from the bottom of said box, said second blade means having the same configuration as said first blade means and being in superposed alignment therewith, passageway means connecting each of the compartments of said box with its corresponding compartment in said mold frame as defined by said first blade means, and valve means for simutaneously controlling the flow of mix through said passageway means;

means on said frame for raising and lowering said mold head relative to said mold frame;

compartmented storage means mounted on said frame for storing and mixing separately colored quantities of said hardenable plastic mix;

tube means leading from each compartment to a compartment in said compartmented box; and valve means for simultaneously controlling the flow of mix from said storage and mixing means to the compartments in said box.

References Cited by the Examiner
UNITED STATES PATENTS

| | | | |
|---|---|---|---|
| 1,140,552 | 5/1915 | Wenicke | 25—103 |
| 1,232,988 | 7/1917 | Smith | 25—41 |
| 2,620,540 | 12/1952 | Weir | 25—41 |

J. SPENCER OVERHOLSER, *Primary Examiner.*

E. MAR, *Assistant Examiner.*